(12) United States Patent
Shiroishi (10) Patent No.: US 11,713,068 B2
(45) Date of Patent: Aug. 1, 2023

(54) STEERING DEVICE

(71) Applicant: YAMADA MANUFACTURING CO., LTD., Kiryu (JP)

(72) Inventor: Yoshinori Shiroishi, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 0 days.

(21) Appl. No.: 17/830,110

(22) Filed: Jun. 1, 2022

(65) Prior Publication Data

US 2022/0396300 A1 Dec. 15, 2022

(30) Foreign Application Priority Data

Jun. 10, 2021 (JP) ................................ 2021-097487
Apr. 15, 2022 (JP) ................................ 2022-067388

(51) Int. Cl.
*B62D 1/187* (2006.01)
*B62D 1/184* (2006.01)

(52) U.S. Cl.
CPC ............. *B62D 1/187* (2013.01); *B62D 1/184* (2013.01)

(58) Field of Classification Search
CPC .................................................... B62D 1/187
See application file for complete search history.

(56) References Cited

FOREIGN PATENT DOCUMENTS

| CN | 202987253 U | * | 6/2013 | |
|---|---|---|---|---|
| CN | 105035154 B | * | 8/2017 | ............ B21D 22/02 |
| FR | 3049256 A1 | * | 9/2017 | ............... B21D 5/00 |
| JP | 2013-075659 A | | 4/2013 | |
| JP | 2013116700 A | * | 6/2013 | |
| JP | 2016052895 A | * | 4/2016 | |
| JP | 2016084137 A | * | 5/2016 | |
| JP | 6065992 B2 | * | 1/2017 | |
| JP | 6119890 B2 | * | 4/2017 | |
| JP | 2017171205 A | * | 9/2017 | ............... B21D 5/00 |
| WO | WO-2004007260 A1 | * | 1/2004 | ............... B62D 1/16 |

* cited by examiner

*Primary Examiner* — Nicole T Verley
(74) *Attorney, Agent, or Firm* — McGinn I.P. Law Group, PLLC (57) ABSTRACT

A left-side side plate is integrally formed downward from an inner end of a left-side upper plate, and a right-side side plate is integrally formed downward from an inner end of a right-side upper plate. A front end of the left-side side plate and a front end of the right-side side plate are connected by a connection upper plate, and the left-side side plate, the connection upper plate, and the right-side side plate are formed continuously and integrally. A total length of the left-side upper plate and the right-side upper plate is formed shorter than a total length of the left-side side plate and the right-side side plate. The length totaling the left-side upper plate and the right-side upper plate is formed substantially equal to the length of the connection upper plate, and all of these members are press worked of a single metal plate.

12 Claims, 7 Drawing Sheets

STEERING DEVICE

BACKGROUND OF THE INVENTION

1. Field of the Invention

The present invention relates to a steering device which has a simple configuration and can be manufactured inexpensively and moreover, can be accommodated in a vehicle in a compact manner.

2. Description of the Related Art

Conventionally, various products have been developed for a vehicle-mounting bracket in the steering device, obtained by integrally press-working a metal plate. They have complicated shapes/structures in many cases.

By the way, in the vehicle-mounting bracket in the steering device having a tilt mechanism provided, if an adjustment range in a vertical direction of tilting is enlarged, lengths on a right-side side plate and a left-side side plate become longer.

Figures 6A, 6B:
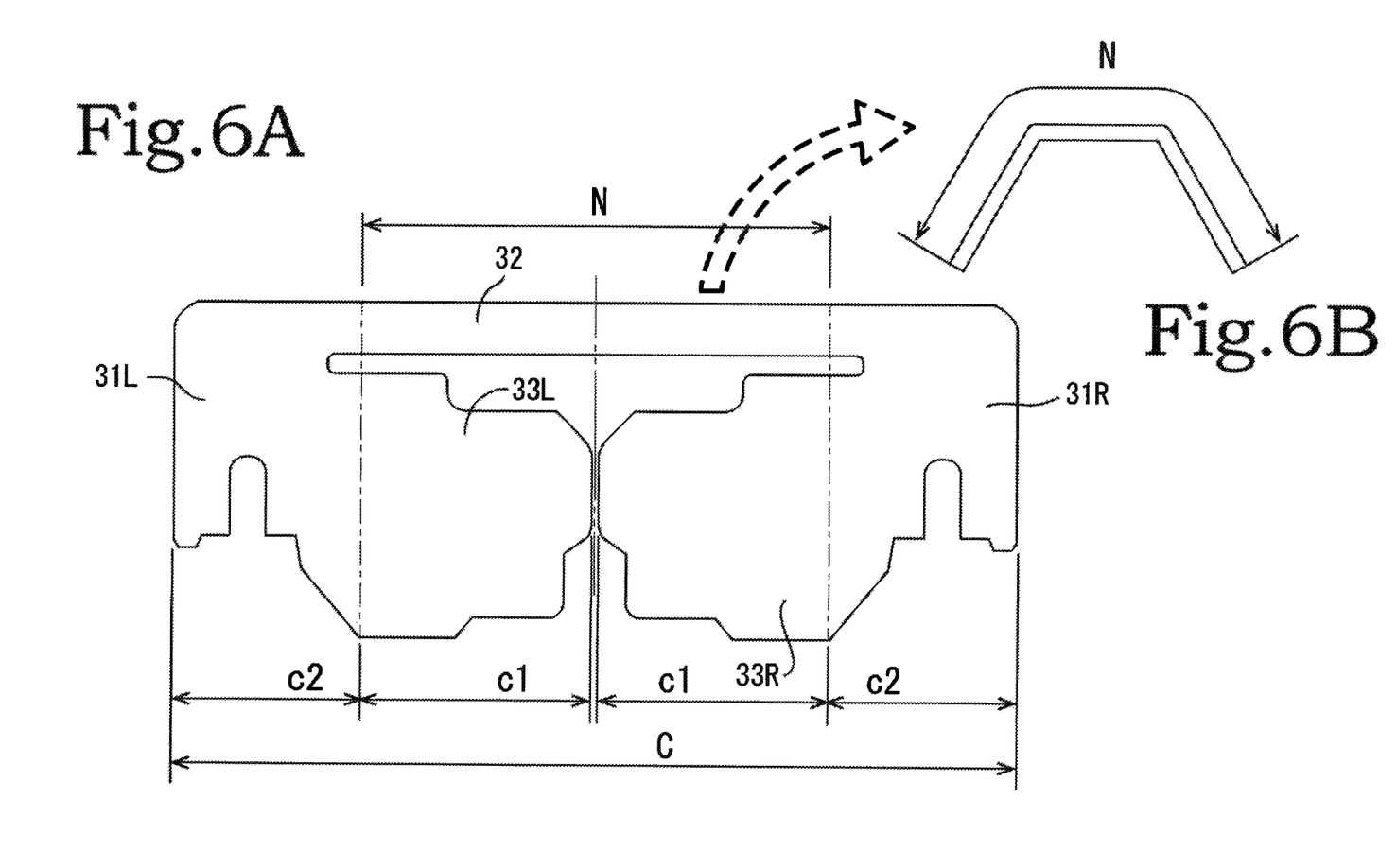
FIG. 6A is FIGS. 3A to 3C of Japanese Patent Application Publication No. 2013-75659 and an expansion view of a vehicle-mounting bracket.
FIG. 6B is a constitutional diagram illustrating a state in which only the connection upper plate portion is taken out and bent.

The vehicle-mounting bracket in Japanese Patent Application Publication No. 2013-75659 has such a configuration that a length of a connection upper plate directly influences the lengths of the right-side side plate and the left-side side plate [see FIGS. 6A and 6B]. Specifically, in an exploded figure before the press-working, a left-side upper plate 31L is formed on a left-side position and a right-side upper plate 31R is formed on a right-side position, respectively. Moreover, a left-side side plate 33L is integrally formed on an inner side of the left-side upper plate 31L, and the right-side side plate 33R is integrally formed on an inner side of the right-side upper plate 31R. And a connection upper plate 32 is formed continuously to the left-side upper plate 31L and the right-side upper plate 31R. A total length of the left-side side plate 33L and the right-side side plate 33R is formed longer than the total length of the left-side upper plate 31L and the right-side upper plate 31R, and a length 2c2 of the total of the left-side side plate 31L and the right-side side plate 31R and a length of the connection upper plate 32 are formed to be equal.

Thus, though the vehicle-mounting bracket of Japanese Patent Application Publication No. 2013-75659 is a press-molded single metal plate and has a relatively simple configuration, the connection upper plate 32 connecting the left-side upper plate 31L and the right-side upper plate 31R is too long. As a result, a height of the connection upper plate 32 of the vehicle-mounting bracket which was bent/worked becomes high, and there is a concern that a mounting performance on a vehicle body would become poor. Thus, the length of the connection upper plate 32 is adjusted by forming a plate thickness T2 of the connection upper plate 32 is formed thicker than a plate thickness T1 of the left-side upper plate 31L, the left-side side plate 33L, the right-side upper plate 31R, and the right-side side plate 33R by compressing while bending with a press or performing machining to enlarge a plate width of the connection upper plate 32.

SUMMARY OF THE INVENTION

Therefore, an object (a technical problem, an object or the like) to be solved by the present invention is to provide a vehicle-mounting bracket in which a connection upper plate can be formed with an appropriate length only by punching and bending a single metal plate without compressing.

Thus, in the present invention, after keen studies in order to solve the above problem, the problem was solved by a first embodiment of the present invention, which is a steering device characterized in that, in a vehicle-mounting bracket of the steering device, a left-side side plate is integrally formed downward from an inner end of a left-side upper plate located on a left side and a right-side side plate is integrally formed downward from an inner end of a right-side upper plate located on a right side, a front end of the left-side side plate and a front end of the right-side side plate are connected by a connection upper plate, the left-side side plate, the connection upper plate, and the right-side side plate are formed continuously and integrally, a total length of the left-side upper plate and the right-side upper plate is formed shorter than the total length of the left-side side plate and the right-side side plate, the total length of the left-side upper plate and the right-side upper plate is formed substantially equal to the length of the connection upper plate, and all of these members are press-worked of a single metal plate.

The problem was solved by a second embodiment of the present invention, which is a steering device characterized in that, in the first embodiment, the left-side upper plate and the right-side upper plate are formed horizontally, respectively, the left-side side plate and the right-side side plate are formed in a suspended state, respectively, and the connection upper plate is formed having a gate shape. The problem was solved by a third embodiment of the present invention, which is a steering device characterized in that, in the first or second embodiment, a three-dimensional surface portion orthogonal to the left-side/right-side upper plates and the left-side/right-side side plates of each of an intersection part between a rear part of the left-side upper plate and a rear part of the left-side side plate and an intersection part between a rear part of the right-side upper plate and a rear part of the right-side side plate is bent/formed. The problem was solved by a fourth embodiment of the present invention, which is a steering device characterized in that, in the first or second embodiment, the left-side upper plate as well as the right-side upper plate and the left-side side plate as well as the right-side side plate are formed symmetrically, respectively, and the connection upper plate is also formed symmetrically.

The problem was solved by a fifth embodiment of the present invention, which is a steering device characterized in that, in the first or second embodiment, the left-side side plate and the right-side side plate are formed symmetrically, the connection upper plate is also formed symmetrically, a lock piece of a spring portion is formed from one side ends of the left-side upper plate and the right-side upper plate, and the left-side upper plate and the right-side upper plate are formed asymmetrically. The problem was solved by a sixth embodiment of the present invention, which is a steering device characterized in that, in the first or second embodiment, the connection upper plate is located closer to a front of a vehicle body than each of front ends of the left-side side plate as well as the right-side side plate and the left-side upper plate as well as the right-side upper plate and has a structure of straddling an upper part of an outer column. The problem was solved by a seventh embodiment of the present invention, which is a steering device characterized in that, in the sixth embodiment, a U-shaped groove is provided between the connection upper plate and the left-side side plate as well as the right-side side plate.

In the present invention, there is an advantage that a steering device accommodated in a compact manner can be provided by having the vehicle-mounting bracket which is press-worked of a single metal plate, and particularly by forming the connection upper plate with a smallest length.

DESCRIPTION OF THE PREFERRED EMBODIMENTS

Hereinafter, embodiments of the present invention will be described with reference to drawings. As shown in FIGS. 1B and 1C, in a vehicle-mounting bracket of a steering device, a left-side side plate 2L is integrally formed downward from an inner end of a left-side upper plate 1L located on a left side. Moreover, a right-side side plate 2R is integrally formed downward from an inner end of a right-side upper plate 1R located on a right side.

Figure 3A:
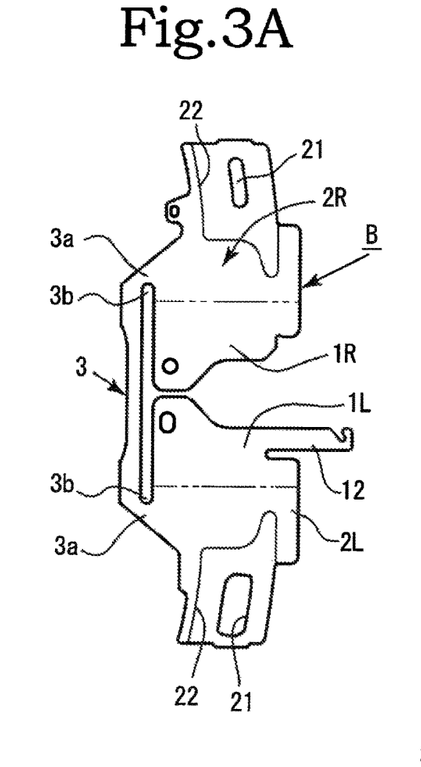
FIGS. 3A to 3C are constitutional diagrams illustrating a process of sequentially manufacturing the vehicle-mounting bracket of the present invention from a single metal plate by press work.
Figure 3B:
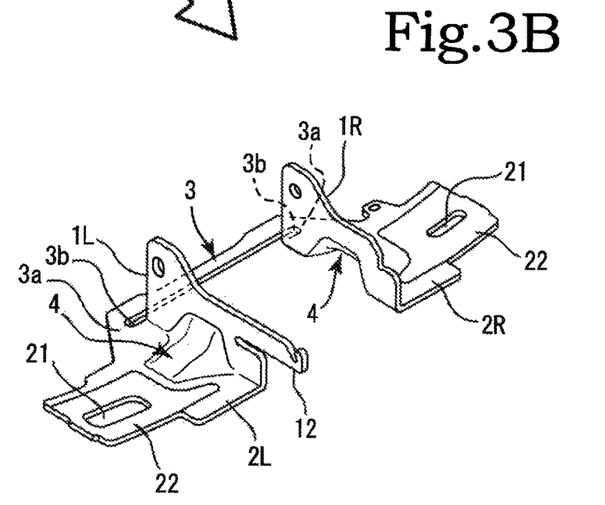

A front end of the left-side side plate 2L and a front end of the right-side side plate 2R are connected by a connection upper plate 3, and the left-side side plate 2L, the connection upper plate 3, and the right-side side plate 2R form a continuous and integrally formed configuration [see FIGS. 3A and 3B].

Figures 2A, 2B:
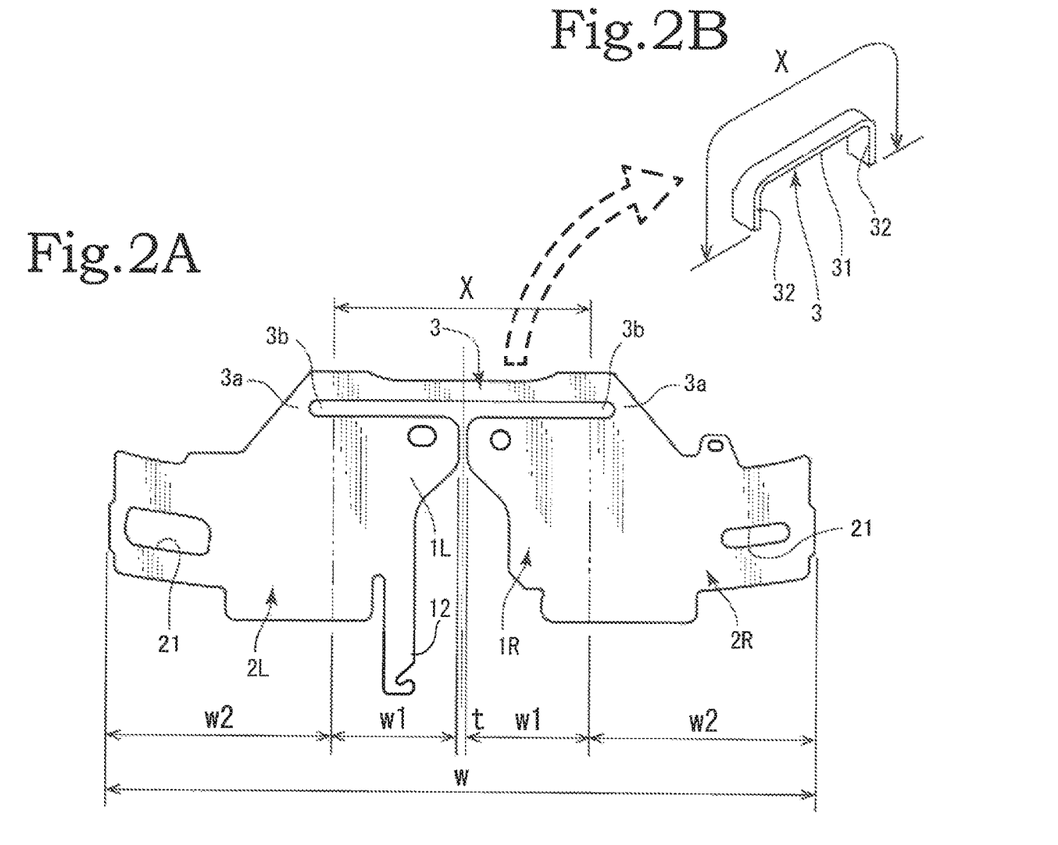
FIG. 2A is an expansion view of the vehicle-mounting bracket of the present invention.
FIG. 2B is a constitutional diagram in which only a connection upper plate is taken out and bent/molded as appropriate.
Figures 5A, 5B:
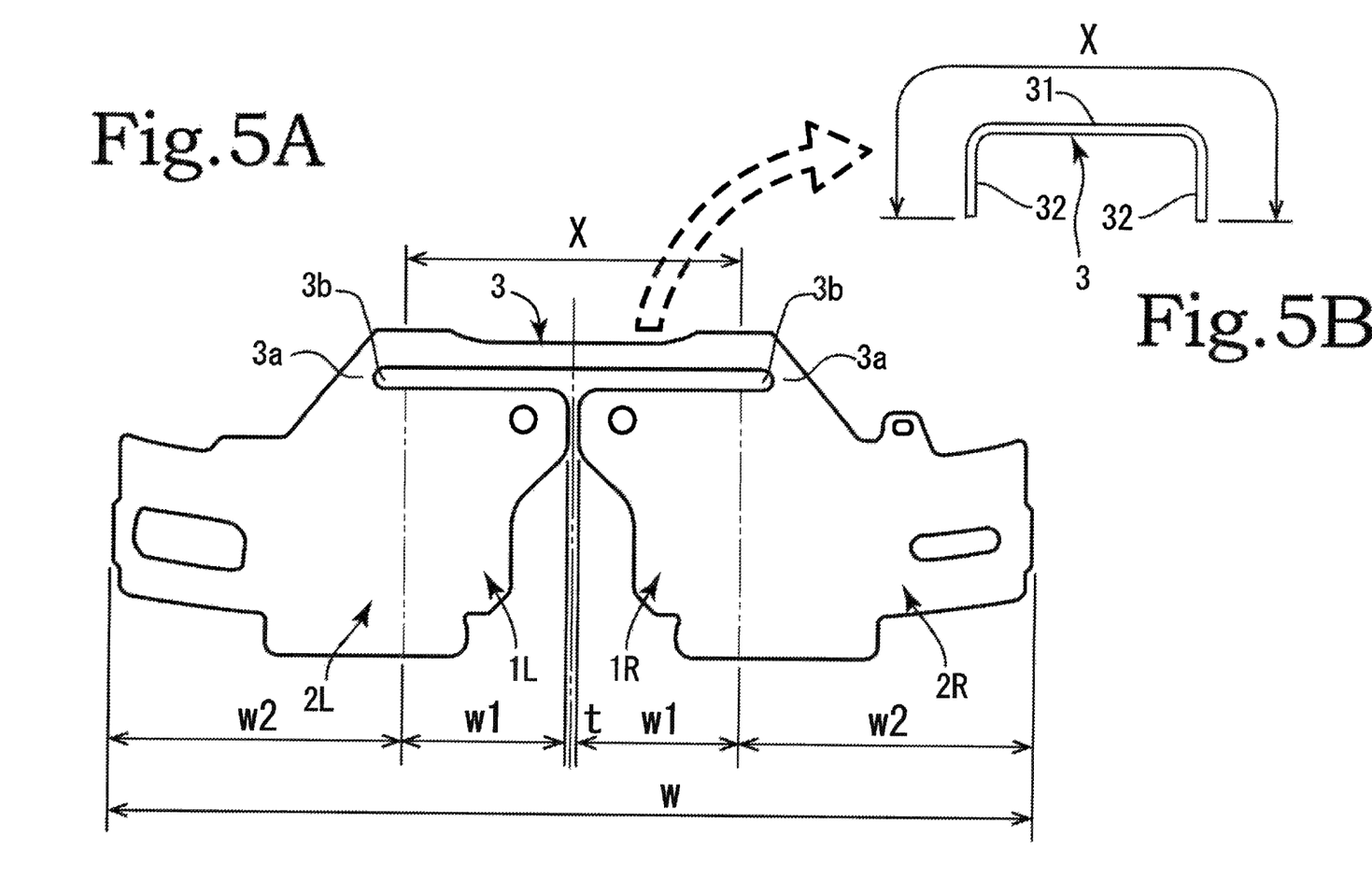
FIG. 5A is an expansion view of a symmetrical vehicle-mounting bracket of another embodiment of the present invention.
FIG. 5B is a constitutional diagram illustrating a state in which only the connection upper plate portion in FIG. 5A is taken out and bent.

Here, as shown in FIG. 2A and FIG. 5A, it is assumed that an entire width of a vehicle-mounting bracket B as an expansion view is W, and the left-side upper plate 1L and the right-side upper plate 1R have the same length w1 in a left-right direction. Moreover, the left-side side plate 2L and the right-side side plate 2R also have the same length w2 in the left-right direction. Furthermore, a slight clearance between the left-side upper plate 1L and the right-side upper plate 1R is assumed to be a clearance t. Then, the entire width W of the vehicle-mounting bracket B is formed as follows:

$$W = 2 \times w2 + 2 \times w1 + t \tag{1}$$

And the length w2 of the left-side side plate 2L and the right-side side plate 2R in the left-right direction is formed longer than the length w1 of the left-side upper plate 1L and the right-side upper plate 1R in the left-right direction.

$$2 \times w2 > 2 \times w1 \tag{2}$$

That is, a total left-right direction length $2w1$ of the left-side upper plate 1L and the right-side upper plate 1R is formed shorter than a total left-right direction length $2w2$ of the left-side side plate 2L and the right-side side plate 2R. And this total left-right direction length $2w1$ is formed so as to be substantially equal (including equal) to a left-right direction length X of the connection upper plate 3.

$$2 \times w1 \approx X \tag{3}$$

That is, the left-right direction length $2w1$ totaling the left-side upper plate 1L and the right-side upper plate 1R is formed so as to be substantially equal to the left-right direction length X of the connection upper plate 3 [see FIGS. 2A and 2B].

The left-side upper plate 1L is a portion formed in a horizontal state, the left-side side plate 2L is a portion formed in a substantially suspended state, and the both are integrally formed. Moreover, similarly, the right-side upper plate 1R is also a portion formed in the horizontal state, the right-side side plate 2R is a portion formed in the substantially suspended state, and the both are integrally formed.

The left-side upper plate 1L, the right-side upper plate 1R, the left-side side plate 2L, and the right-side side plate 2R are present as major portions, respectively, and subordinate-concept terms provided on each portion are also present equally on the left side and the right side but since they are repetitious and become long and complicated terms, characters of the left side and the right side will be omitted.

On the front end sides of the left-side upper plate 1L and the right-side upper plate 1R, mounting spots 11 as attachment spots to the vehicle body are formed. Moreover, at lower positions of the left-side side plate 2L and the right-side side plate 2R, tilt long holes 21 are drilled, respectively. Furthermore, step portions 22 with slight widths are formed in the peripheries of the tilt long holes 21.

The connection upper plate 3 forms, as shown in FIG. 1B, a gate-shaped section. Specifically, a horizontal top portion 31 and suspended portions 32 in a state suspended downward from both ends of the top portion 31 are formed. The connection upper plate 3 is not limited to the suspended state with the gate-shaped section but may be a gate-shaped section having an appropriate angle.

Reference numeral 4 denotes a large-sized rib and largely formed for reinforcement at each of a corner part between the left-side upper plate 1L and the left-side side plate 2L and moreover at a corner part between the right-side upper plate 1R and the right-side side plate 2R. That is, the large-sized rib 4 is formed of an inclined surface 41 having a substantially square surface and triangular surfaces 42 on both sides thereof.

Figures 4D, 4E, 4F, 4G:
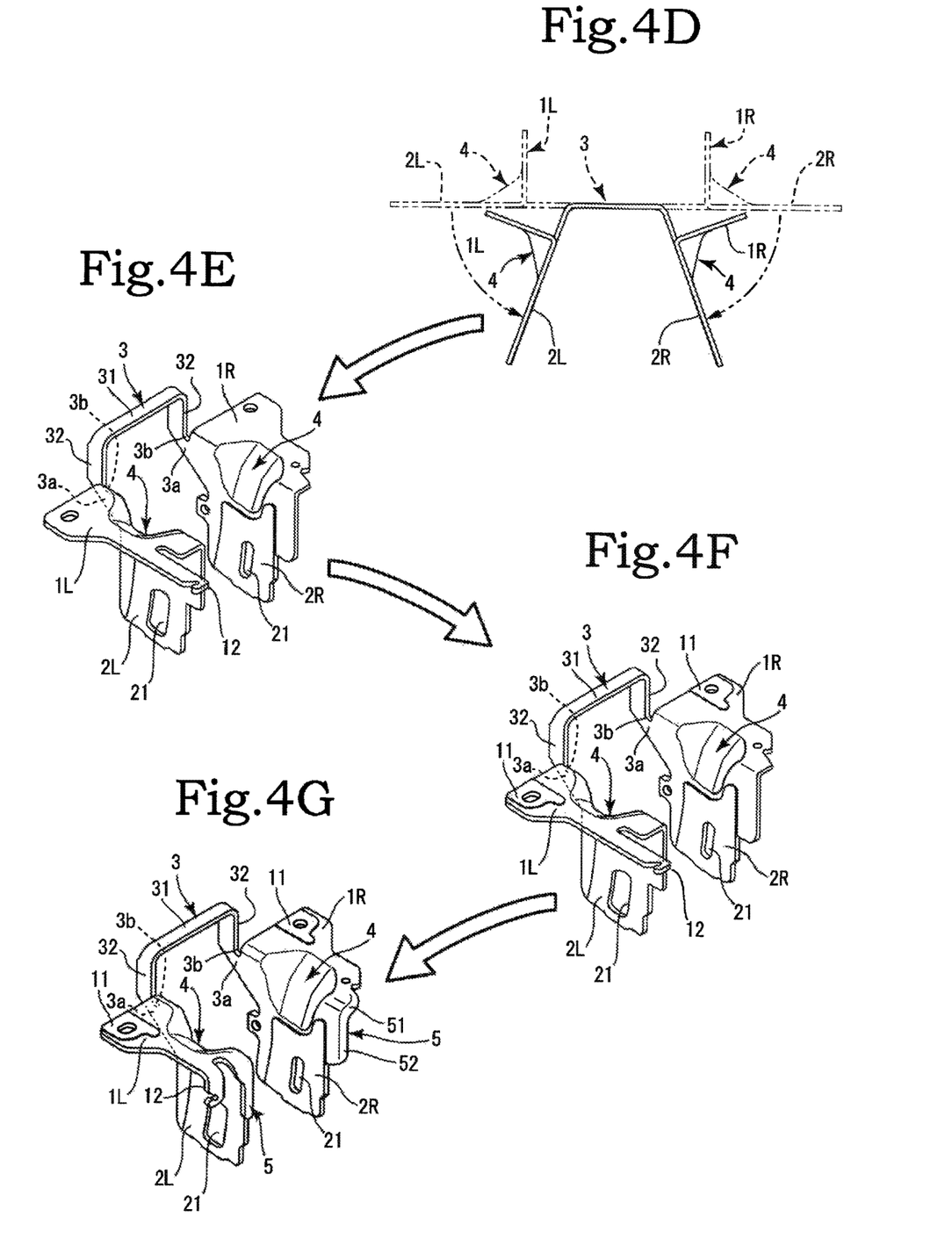
FIGS. 4D to 4G are constitutional diagrams illustrating a process of sequentially manufacturing the vehicle-mounting bracket of the present invention to a final shape plate by press-work.

Reference numeral 5 denotes a three-dimensional surface portion and is bent/formed as a surface portion orthogonal to an upper plate and a side plate of each of an intersection portion between the rear part of the left-side upper plate 1L and the rear part of the left-side side plate 2L and an intersection portion between the rear part of the right-side upper plate 1R and the rear part of the right-side side plate 2R. In the embodiment, as shown in FIG. 1C, FIG. 2C, and FIG. 4G, the intersection is formed as a part of a spherical surface. Moreover, an upper-plate bent surface 51 is formed on each of rear part ends of the left-side/right-side upper plates, and a side-plate bent surface 52 is formed on each of rear part ends of the left-side/right-side side plates and are integrated at the corner parts.

Figure 1A:
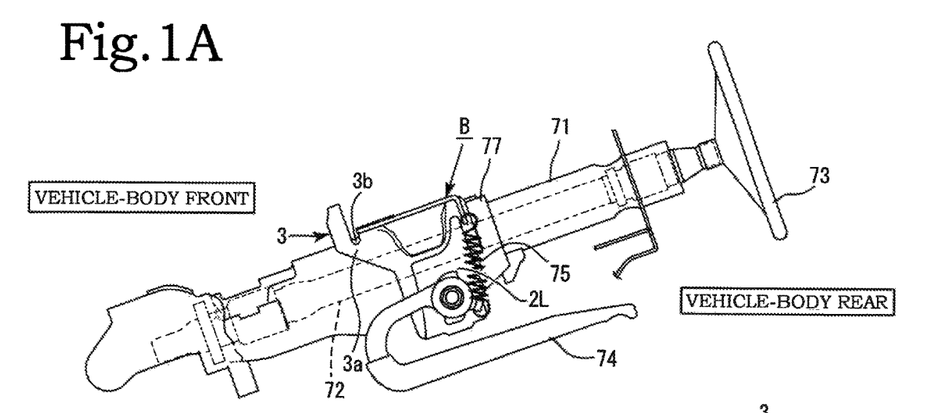
FIG. 1A is a side view of a steering device of the present invention.
Figures 1B, 1C:
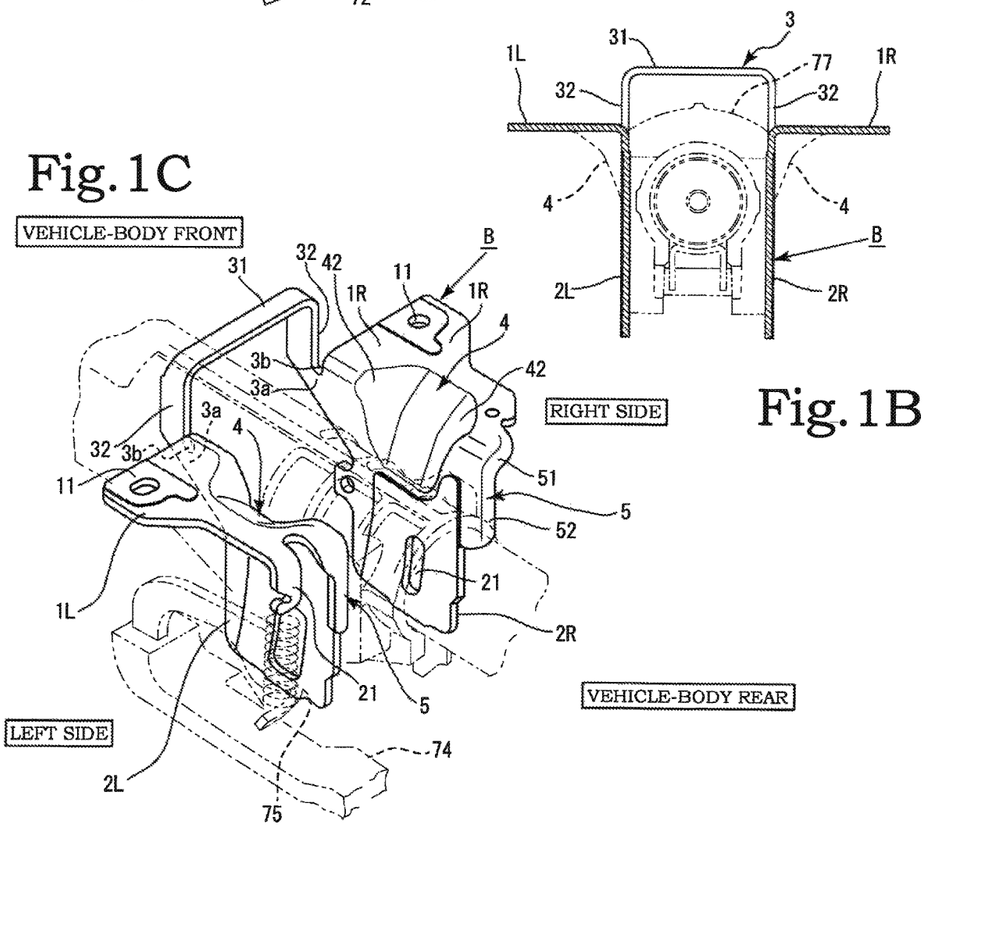
FIG. 1B is an elevation of a partial section of a vehicle-mounting bracket of the present invention.
FIG. 1C is a perspective view of a vehicle-body mounting bracket of the present invention.
Figure 2C:
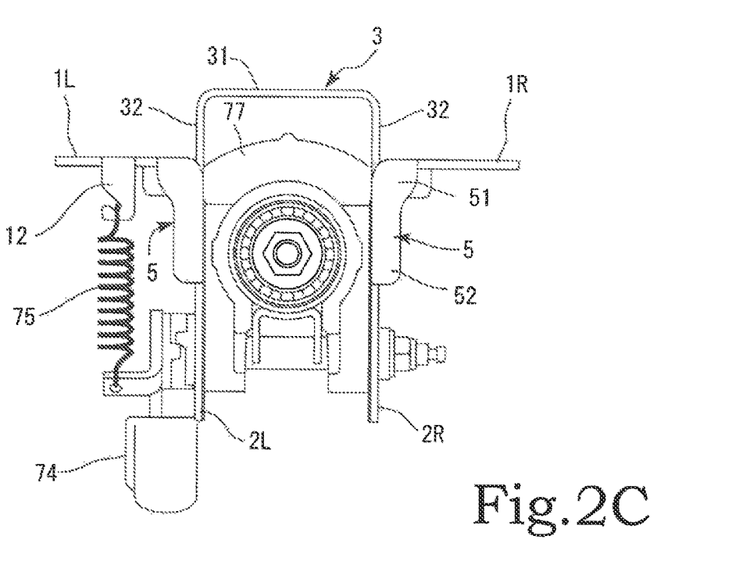
FIG. 2C is an elevation of FIG. 1C when seen from a right side and a column-related member indicated by a solid line.

In the steering device in FIGS. 1A and 1B, a steering shaft 72 is rotatably built in a column tube 71, and a steering wheel (handle) 73 is attached to a rear part of the steering shaft 72. Reference numeral 74 denotes a tilt lever, and a spring 75 and the like biasing the steering device upward are provided.

The column tube 71 is inserted through an outer column 77 and is configured to be the tilt mechanism for the vehicle-mounting bracket B and the outer column 77. The column tube 71 is locked (fixed) at a fastening portion such as a bolt or the like inserted through the tilt long holes 21 formed in the left/right side plates of the vehicle-mounting bracket B and the outer column 77. The fastening portion such as the bolt or the like is configured to be capable of height adjustment of the steering wheel (handle) 73 within a vertical range of the tilt long holes 21 by being unlocked by a rotational operation of the tilt lever 74.

Subsequently, a manufacturing method of the vehicle-mounting bracket B will be described. The vehicle-mounting bracket B is, as shown in FIGS. 3A to 3C and FIGS. 4D to 4G, molded by press-work of a single metal plate, and the manufacturing method thereof will be explained. First, before the press molding, in the expansion view shown in FIG. 2A, the left-side side plate 2L and the right-side side plate 2R are disposed so as to be located on the outermost side on left/right sides, and the left-side upper plate 1L is disposed inside the left-side side plate 2L, and the right-side upper plate 1R is disposed inside the right-side side plate 2R, respectively. The front end of the left-side side plate 2L and the front end of the right-side side plate 2R are formed continuously to the connection upper plate 3 in advance [see FIGS. 1B and 1C].

Figure 3C:
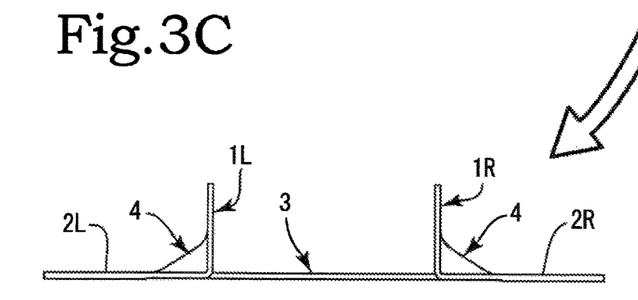

And by performing punching, each of the left-side upper plate 1L and the right-side upper plate 1R is bent perpendicularly by approximately 90 degrees [see FIGS. 3B and 3C]. At the same time as this bending by approximately 90 degrees, the large-sized ribs 4 are bent/formed [see FIGS. 3B and 3C].

Then, the left-side upper plate 1L and the right-side upper plate 1R are bent from the flat-state positions [see FIG. 3C] to directions opposite to the bending directions of the left-side upper plate 1L and the right-side upper plate 1R. At the same time, as shown in FIG. 4D, the connection upper plate 3 is bent by approximately 60 to 80 degrees and is further bent to be bent/formed by approximately 90 degrees. That is, molding is performed so that the left-side side plate 2L and the right-side side plate 2R are substantially in parallel [see FIG. 4E].

As described above, when the left-side side plate 2L and the right-side side plate 2R are molded, bending/molding of the connection upper plate 3 is performed at the same time. That is, a spot at an appropriate length of the top portion 31 of the connection upper plate 3 which has been linear so far is bent/molded so as to be a bent spot [see FIGS. 4D and 4E].

That is, in the connection upper plate 3 which has been simply horizontal in the state in FIG. 3C, the horizontal top portion 31 and the suspended portions 32 suspended downward from the both ends of the top portion 31 are formed at stages in FIGS. 4D and 4E.

Then, in FIG. 4F, the mounting spots 11 are press-worked on each of the left-side upper plate 1L and the right-side upper plate 1R, and at the final state in FIG. 4G, the three-dimensional surface portions 5 and a lock piece 12 of the spring portion 75 are formed on rear part of the left-side upper plate 1L.

As described above, though being press-worked, in the manufacturing method of the present invention, it is only necessary that constituent portions are present as manufacturing processes in FIGS. 3B and 3C to FIGS. 4D to 4E, and the order is not limited in the portion molding after that. Moreover, the three-dimensional surface portions 5 may be bent/formed at the same time as the large-sized ribs 4 in some cases.

In the vehicle-body mounting bracket in the steering device of this embodiment, the connection upper plate 3 is connected to the front end of the left-side side plate 2L and the front end of the right-side side plate 2R. And as shown in FIGS. 2A and 2B and FIGS. 5A and 5B, the total left-right direction length of the left-side side plate 2L and the right-side side plate 2R is formed longer than the total left-right direction length of the left-side upper plate 1L and the right-side upper plate 1R, and the left-right direction length $2w1$ totaling the left-side upper plate 1L and the right-side upper plate 1R is formed so as to be substantially equal to the left-right direction length X of the connection upper plate 3.

As a result, the connection upper plate 3 can be formed to an optimal length only by punching/bending a metal plate without performing a compression process. As a result, the steering device which can reduce costs and can be accommodated inside the vehicle in a compact manner can be provided. Moreover, as shown in FIGS. 5A and 5B, in another embodiment of the present invention, the left-side upper plate 1L as well as the right-side upper plate 1R and the left-side side plate 2L as well as the right-side side plate 2R may be formed symmetrically, respectively, without forming the lock piece 12 of the spring portion 75.

Subsequently, in the vehicle-mounting bracket B in the present invention, there is an embodiment in which the connection upper plate 3 is located closer to the front of the vehicle body than each of the front ends of the left-side side plate 2L as well as the right-side side plate 2R and the left-side upper plate 1L as well as the right-side upper plate 1R, and the connection upper plate 3 is configured to straddle the upper part of the outer column 77 [see FIGS. 1A and 1C, FIG. 4G, FIGS. 7A to 7C and the like]. Hereinafter, this embodiment will be described.

In this embodiment, the connection upper plate 3 is configured to be formed at a position away to the front side of the vehicle body from the position of each of the front ends of the left-side side plate 2L, the right-side side plate 2R, the left-side upper plate 1L, and the right-side upper plate 1R along axial directions of the column tube 71, the steering shaft 72, and the outer column 77. Moreover, specifically, the rear ends of the both suspended portions 32 of the connection upper plate 3 and the front ends of the left-side side plate 2L and the right-side side plate 2R are configured to be separated from each other [see FIGS. 7A to 7C].

And the connection upper plate 3 as well as the left-side side plate 2L and the connection upper plate 3 as well as the right-side side plate 2R are connected at continuing portions 3a with a small area, respectively. The continuing portion 3a is a region located between the both suspended portions 32 of the connection upper plate 3 and the left-side side plate 2L as well as the right-side side plate 2R and is a portion continuously connecting the both suspended portions 32 of the connection upper plate 3 and the left-side side plate 2L as well as the right-side side plate 2R.

The continuing portion 3a is included in the expansion view of the vehicle-mounting bracket B and is formed with the other portions when at cutting-out from the metal plate [see FIG. 2A, FIG. 3A and the like]. As a result, the connection upper plate 3 becomes a portion mutually independent of the left-side side plate 2L as well as the right-side side plate 2R and the left-side upper plate 1L as well as the right-side upper plate 1R. Moreover, the connection upper plate 3 of the vehicle-mounting bracket B is configured to straddle the upper part of the outer column 77.

Figures 7A, 7B, 7C:
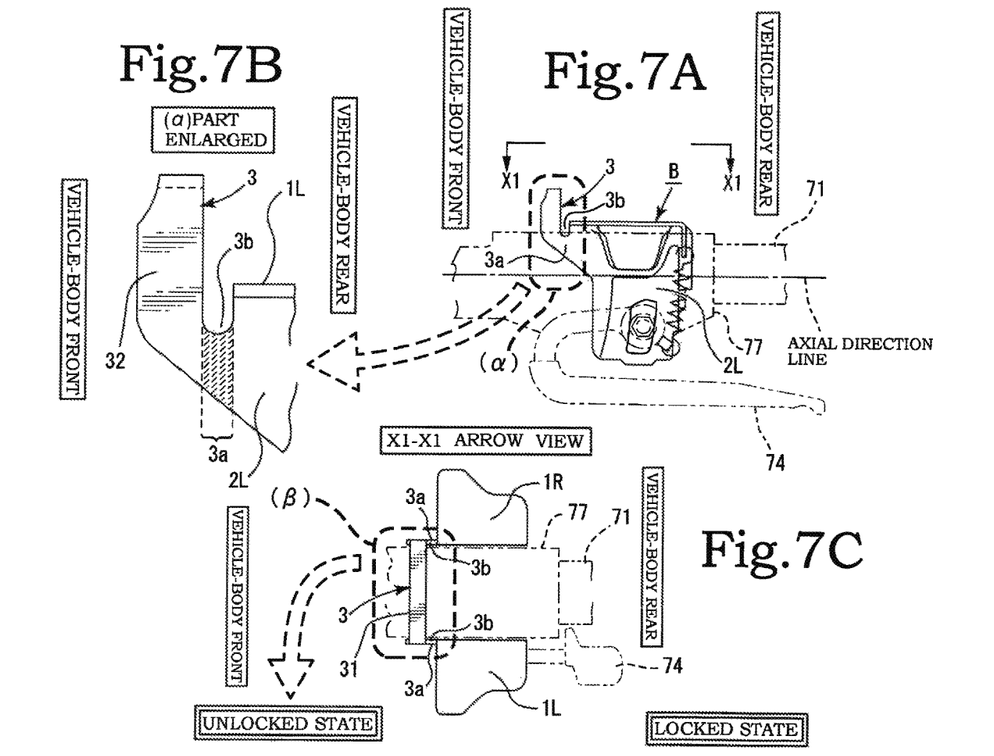
FIG. 7A is a side view of the vehicle-mounting bracket in the present invention.
FIG. 7B is an enlarged view of (a) part in FIG. 7A.
FIG. 7C is an X1-X1 arrow view of FIG. 7A.
Figure 7D:
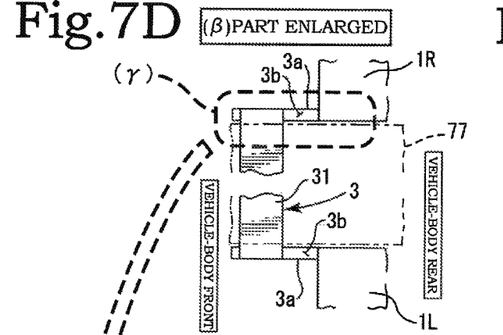
FIG. 7D is an enlarged view of (β) part in an unlocked state in FIG. 7C.
Figures 7E, 7G:
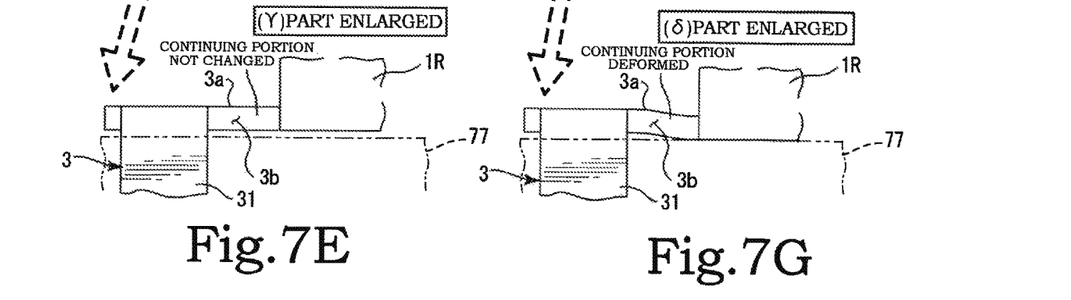
FIG. 7E is an enlarged view of (γ) part in FIG. 7D.
FIG. 7G is an enlarged view of (δ) part.
Figure 7F:
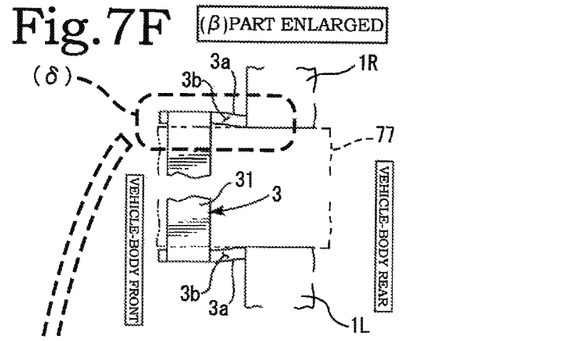
FIG. 7F is an enlarged view of the (β) part in a locked state in FIG. 7C.

As described above, the connection upper plate 3 is present at the position separated away from the left-side side plate 2L as well as the right-side side plate 2R and the left-side upper plate 1L as well as the right-side upper plate 1R. Thus, in the vehicle-mounting bracket B, when the left-side side plate 2L, the right-side side plate 2R fix the outer column 77 into the tilt lock state [see FIGS. 7F and 7G] by fastening the tilt lever 74 or when it is brought into the tilt unlock state by loosening the fastening [see FIGS. 7D and 7E], expansion/contraction for enlarging or reducing an interval between the left-side side plate 2L and the right-side side plate 2R is performed [see FIGS. 7C to 7G]. At this time, the left-side side plate 2L and the right-side side plate 2R can sandwich the outer column 77 by deformation of the continuing portion 3a (continuing portion deformation) [see FIG. 7F] without the connection upper plate 3 resisting the expansion/contraction [see FIGS. 7F and 7C].

More specifically, a fastening force by the tilt lever 74 is applied to the left-side side plate 2L as well as the right-side side plate 2R to each other, the left-side upper plate 1L, and the right-side upper plate 1R, and the fastening force is hardly transmitted to or influences the connection upper plate 3 connected to them through the continuing portion 3a with a small area. Therefore, a load at a fastening operation of the tilt lever 74 is applied to the continuing portion 3a, and the continuing portion 3a is deformed (continuing portion deformation) [see FIGS. 7F and 7G] and thus, the connection upper plate 3 does not form a resisting force at the fastening operation. Therefore, at the fastening operation of the tilt lever 74, such a configuration can be realized that the left-side side plate 2L as well as the right-side side plate 2R to each other, the left-side upper plate 1L, and the right-side upper plate 1R can be brought closer to or separated away from each other easily with respect to the outer column 77, and a favorable fastened state can be obtained with respect to the outer column 77 [see FIGS. 6F and 6C]. Moreover, in the unlocked state, a load is not applied to the both continuing portions 3a of the vehicle-mounting bracket B, which are not deflected or deformed. That is, the continuing portion 3a is not changed. This state in which the continuing portion 3a is not deformed (continuing portion not changed) is described in FIGS. 7D and 7E.

Thus, the vehicle-mounting bracket has such a structure that the fastening load is hardly transmitted mutually among the left-side side plate 2L, the right-side side plate 2R, the left-side upper plate 1L as well as the right-side upper plate 1R, and the connection upper plate 3 at the fastening operation by the tilt lever 74 to the outer column 77. Thus, the connection upper plate 3 can make the resisting force to the fastening of the outer column 77 by the left-side side plate 2L and the right-side side plate 2R extremely small. Therefore, the left-side side plate 2L and the right-side side plate 2R are smoothly brought closer by the fastening by the fastening portion, which brings about a substantially uniform planar contact state with respect to the outer column 77, and the fastened state can be made firm.

Subsequently, in the aforementioned embodiment, the horizontal top portion 31 of the connection upper plate 3 and the suspended portions 32 suspended downward from the both ends of the top portion 31 are formed, and a U-shaped groove 3b is provided between the suspended portions 32 and the left-side side plate 2L, the left-side upper plate 1L as well as the right-side side plate 2R, and the right-side upper plate 1R in some cases [see FIGS. 1A and 1C, FIG. 4G, FIGS. 6A and 6B, and the like]. The U-shaped groove 3b is located substantially immediately above the continuing portion 3a. And the both suspended portions 32 of the connection upper plate 3 and the left-side side plate 2L as well as the right-side side plate 2R are separated by the U-shaped groove 3b, and the continuing portion 3a becomes a portion with a smaller area [see FIGS. 7A and 7B].

By having the structure in which the U-shaped groove 3b is provided between the connection upper plate 3 and the left-side side plate 2L as well as the right-side side plate 2R, the connection upper plate 3 and the left-side side plate 2L as well as the right-side side plate 2R are brought into a separated state further separated by the U-shaped groove 3b. Thus, the connection upper plate 3 can make the resisting force at the fastening of the outer column 77 by the left-side side plate 2L and the right-side side plate 2R further smaller, and the fastened state with respect to the outer column 77 becomes a uniform planar contact and can be made further favorable and firm.

The U-shaped groove 3b is provided in advance in the expansion view of the vehicle-mounting bracket B when the vehicle-mounting bracket B is molded by press-work of a single metal plate. That is, the portion of the U-shaped groove 3b is provided in advance between the connection upper plate 3 and the front end of the left-side side plate 2L as well as the front end of the right-side side plate 2R. The U-shaped groove 3b forms a substantially U-shape [see FIG. 7B]. Moreover, the U-shaped groove 3b has a substantially rectangular shape in some cases. The U-shaped groove 3b also has a role to facilitate bending/forming of the vehicle-mounting bracket B by press-work.

The second embodiment exerts the effect similar to that of the first embodiment. The third embodiment exerts such an effect that a particularly firm vehicle-mounting bracket can be manufactured by presence of the three-dimensional surface portion bent/formed so as to be orthogonal to the upper plate and the side plate. The fourth embodiment has such an advantage of inexpensive manufacture with a simpler structure by having a symmetrical vehicle-mounting bracket. The fifth embodiment has such an effect that mounting of the spring portion biasing the steering device upward can be made simple and easy by forming the left-side upper plate and the right-side upper plate asymmetrically and by forming the lock piece of the spring portion from the one side end.

In the sixth embodiment, the vehicle-mounting bracket is constituted integrally by the left-side side plate, the left-side upper plate as well as the right-side side plate, and the right-side upper plate by the connection upper plate. However, when the left-side side plate and the right-side side plate of the vehicle-mounting bracket are to be brought into the locked (fastened/fixed) state by fastening of the outer column by the fastening portion such as the bolt or the like, there is a concern that, in the bracket in the prior art, the connection upper plate becomes a resisting member to the fastening operation to the outer column by the left-side side plate and the right-side side plate. In the vehicle-mounting bracket in the present invention, the connection upper plate is located closer to the front of the vehicle body than each of the front ends of the left-side side plate as well as the right-side side plate, the left-side upper plate, and the right-side upper plate. Thus, the vehicle-mounting bracket has a structure that the fastening load is hardly transmitted mutually among each portion of the left-side side plate, the right-side side plate, the left-side upper plate, and the right-side upper plate and the connection upper plate at the fastening operation to the outer column by the tilt lever. Thus, the connection upper plate can make the resisting force to the fastening to the outer column by the left-side side plate and the right-side side plate extremely small. Therefore, the left-side side plate and the right-side side plate are smoothly brought closer by the fastening by the fastening portion, which brings about a substantially uniform planar contact state with respect to the outer column, and the fastened state can be made firm. In the seventh embodiment, by having the structure in which the U-shaped groove is provided between the connection upper plate and the left-side side plate as well as the right-side side plate, the connection upper plate and the left-side side plate as well as the right-side side plate are brought into the separated state further separated by the U-shaped groove and thus, the connection upper plate can make the resisting force to the fastening to the outer column by the left-side side plate as well as the right-side side plate further smaller, and the fastened state with respect to the outer column can be made further firm.

What is claimed is:

1. A steering device, in a vehicle-mounting bracket of the steering device, wherein
    a left-side side plate is integrally formed downward from an inner end of a left-side upper plate located on a left side, and a right-side side plate is integrally formed downward from an inner end of a right-side upper plate located on a right side;
    a front end of the left-side side plate and a front end of the right-side side plate are connected by a connection upper plate, and the left-side side plate, the connection upper plate, and the right-side side plate are formed continuously and integrally;
    the connection upper plate is formed at a position separated away from a position on a front end of each of the left-side side plate, the right-side side plate, the left-side upper plate, and the right-side upper plate toward a vehicle front side along an axial direction;
    the connection upper plate and the left-side side plate as well as and the right-side side plate are connected by continuing portions, respectively; and
    a total left-right direction length of the left-side upper plate and the right-side upper plate is formed shorter than the total left-right direction length of the left-side side plate and the right-side side plate, the left-right direction length totaling the left-side upper plate and the right-side upper plate is formed substantially equal to the left-right direction length of the connection upper plate, and all of these members are press worked of a single metal plate.

2. The steering device according to claim 1, wherein
    the left-side upper plate and the right-side upper plate are formed horizontally, respectively, the left-side side plate and the right-side side plate are formed in a suspended state, respectively, and the connection upper plate is formed having a gate shape.

3. The steering device according to claim 2, wherein
    a three-dimensional surface portion orthogonal to the left-side/right-side upper plates and the left-side/right-side side plates of each of an intersection part between a rear part of the left-side upper plate and a rear part of the left-side side plate and an intersection part between a rear part of the right-side upper plate and a rear part of the right-side side plate is bent/formed.

4. The steering device according to claim 2, wherein
    the left-side upper plate as well as the right-side upper plate and the left-side side plate as well as the right-side side plate are formed symmetrically, respectively, and the connection upper plate is also formed symmetrically.

5. The steering device according to claim 2, wherein
    the connection upper plate is located closer to a front of a vehicle body than each of front ends of the left-side side plate as well as the right-side side plate and the left-side upper plate as well as the right-side upper plate and has a structure of straddling an upper part of an outer column.

6. The steering device according to claim 5, wherein
    a U-shaped groove is provided between the connection upper plate and the left-side side plate as well as the right-side side plate.

7. The steering device according to claim 1, wherein
    a three-dimensional surface portion orthogonal to the left-side/right-side upper plates and the left-side/right-side side plates of each of an intersection part between a rear part of the left-side upper plate and a rear part of the left-side side plate and an intersection part between a rear part of the right-side upper plate and a rear part of the right-side side plate is bent/formed.

8. The steering device according to claim 1, wherein
    the left-side upper plate as well as the right-side upper plate and the left-side side plate as well as the right-side side plate are formed symmetrically, respectively, and the connection upper plate is also formed symmetrically.

9. The steering device according to claim 1, wherein
    the connection upper plate is located closer to a front of a vehicle body than each of front ends of the left-side side plate as well as the right-side side plate and the left-side upper plate as well as the right-side upper plate and has a structure of straddling an upper part of an outer column.

10. The steering device according to claim 9, wherein
    a U-shaped groove is provided between the connection upper plate and the left-side side plate as well as the right-side side plate.

11. A steering device, in a vehicle-mounting bracket of the steering device, wherein
    a left-side side plate is integrally formed downward from an inner end of a left-side upper plate located on a left side, and a right-side side plate is integrally formed downward from an inner end of a right-side upper plate located on a right side;
    a front end of the left-side side plate and a front end of the right-side side plate are connected by a connection upper plate, and the left-side side plate, the connection upper, and the right-side side plate are formed continuously and integrally;
    a total left-right direction length of the left-side upper plate and the right-side upper plate is formed shorter than the total left-right direction length of the left-side side plate and the right-side side plate, the left-right direction length totaling the left-side upper plate and the right-side upper plate is formed substantially equal to the left-right direction length of the connection upper plate, and all of these members are press worked of a single metal plate; and the left-side side plate and the right-side side plate are formed symmetrically, the connection upper plate is also formed symmetrically, a lock piece of a spring portion is formed from one side ends of the left-side upper plate and the right-side upper plate, and the left-side upper plate and the right-side upper plate are formed asymmetrically.

12. A steering device, in a vehicle-mounting bracket of the steering device, wherein a left-side side plate is integrally formed downward from an inner end of a left-side upper plate located on a left side, and a right-side side plate is integrally formed downward from an inner end of a right-side upper plate located on a right side;

a front end of the left-side side plate and a front end of the right-side side plate are connected by a connection upper plate, and the left-side side plate, the connection upper plate, and the right-side side plate are formed continuously and integrally;

a total left-right direction length the left-side upper plate and the right-side upper plate is formed shorter than the total left-right direction length of the left-side side plate and the right-side side plate, the left-right direction length totaling the left-side upper plate and the right-side upper plate is formed substantially equal to the left-right direction length of the connection upper plate, and all of these members are press worked of a single metal plate;

the left-side upper plate and the right-side upper plate are formed horizontally, respectively, the left-side side plate and the right-side side plate are formed in a suspended state, respectively, and the connection upper plate is formed having a gate shape; and the left-side side plate and the right-side side plate are formed symmetrically, the connection upper plate is also formed symmetrically, a lock piece of a spring portion is formed from one side ends of the left-side upper plate and the right-side upper plate, and the left-side upper plate and the right-side upper plate are formed asymmetrically.

\* \* \* \* \*